US012320292B2

(12) United States Patent
Rabhi (10) Patent No.: US 12,320,292 B2
(45) Date of Patent: Jun. 3, 2025

(54) FRICTION INSERT FOR ORIENTED VALVE (71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 332 days.

(21) Appl. No.: 18/097,859

(22) Filed: Jan. 17, 2023

(65) Prior Publication Data

US 2024/0240584 A1 Jul. 18, 2024

(30) Foreign Application Priority Data

Jan. 16, 2023 (FR) ...................................... 2300390

(51) Int. Cl.
*F02B 19/02* (2006.01)
*F02B 19/12* (2006.01)

(52) U.S. Cl.
CPC .............. *F02B 19/02* (2013.01); *F02B 19/12* (2013.01)

(58) Field of Classification Search
CPC ..................................................... F02B 19/02
See application file for complete search history.

(56) References Cited

U.S. PATENT DOCUMENTS

| 10,550,757 | B2 * | 2/2020 | Rabhi | ................... F02B 17/005 |
| 11,187,141 | B2 * | 11/2021 | Rabhi | ....................... F02F 1/24 |
| 11,326,509 | B2 * | 5/2022 | Rabhi | ................. F02B 19/1014 |
| 11,867,114 | B2 * | 1/2024 | Rabhi | ................... F02B 19/165 |
| 2003/0170340 | A1 * | 9/2003 | Sicilia | .................... B29C 45/278 |
| | | | | 425/566 |
| 2019/0072025 | A1 * | 3/2019 | Rabhi | ..................... F02B 19/18 |
| 2020/0080508 | A1 * | 3/2020 | Rabhi | ................. F02B 19/1071 |
| 2020/0362750 | A1 * | 11/2020 | Rabhi | ..................... F02B 19/18 |
| 2021/0254543 | A1 * | 8/2021 | Rabhi | ..................... F02B 19/02 |
| 2022/0120208 | A1 * | 4/2022 | Rabhi | ................... F02B 19/165 |
| 2024/0240584 | A1 * | 7/2024 | Rabhi | ................... F02P 15/006 |

FOREIGN PATENT DOCUMENTS

| AU | 2020276402 | A1 | * | 12/2021 | ............. F02B 19/02 |
| CA | 3139564 | A1 | * | 11/2020 | ............. F02B 19/02 |
| CN | 107339149 | A | * | 11/2017 | .......... F02B 19/1014 |
| CN | 113795655 | A | * | 12/2021 | ............. F02B 19/02 |
| EP | 3969735 | A1 | * | 3/2022 | ............. F02B 19/02 |
| FR | 3061743 | A1 | * | 7/2018 | ............. F02B 19/02 |
| FR | 3061743 | B1 | * | 8/2019 | ............. F02B 19/02 |
| FR | 3085718 | A1 | * | 3/2020 | ............. F02B 19/02 |
| FR | 3096078 | A1 | * | 11/2020 | ............. F02B 19/02 |
| FR | 3096079 | A1 | * | 11/2020 | ............. F02B 19/02 |

(Continued)

*Primary Examiner* — Kevin R Steckbauer
(74) *Attorney, Agent, or Firm* — NIXON & VANDERHYE (57) ABSTRACT

The friction insert for oriented valve is intended for a valve-controlled ignition prechamber and includes an external valve body guide cylindrical bearing surface which is arranged at the periphery of a valve having a guide pin and which slides with a small clearance into a first valve body guide, the insert also including an external pin guide cylindrical bearing surface which is arranged at the external periphery of an orientation pin and which slides with a small clearance into a second orientation pin guide, the valve body guide and orientation pin guide being resistant to abrasive wear and being fixedly mounted in a non-magnetic prechamber tip in which they guide and orient the valve having a guide pin.

7 Claims, 7 Drawing Sheets

(56) References Cited

FOREIGN PATENT DOCUMENTS

| FR | 3085718 B1 * | 6/2021 | ............. F02B 19/02 |
|----|---|---|---|
| FR | 3107305 A1 * | 8/2021 | ............. F02B 19/02 |
| FR | 3107305 B1 * | 2/2022 | ............. F02B 19/02 |
| FR | 3115323 A1 * | 4/2022 | |
| FR | 3096079 B1 * | 11/2022 | ............. F02B 19/02 |
| WO | WO-2020229775 A1 * | 11/2020 | ............. F02B 19/02 |
| WO | WO-2022079367 A1 * | 4/2022 | |

* cited by examiner

FRICTION INSERT FOR ORIENTED VALVE

BACKGROUND OF THE INVENTION

The present invention aims for a friction insert for oriented valve which forms an improvement of the valve-controlled ignition prechamber, which is the subject matter of patent no. FR 3 061 743 published on 16 Aug. 2019 and belonging to the applicant.

The friction insert for oriented valve according to the present invention is advantageously combined with the main improvements of said prechamber according to patent FR 3 061 743, said improvements having formed the subject matter of several patent applications.

Among said improvements, the "magnetic valve return device", subject matter of French patent application no. 3 085 718 published on 13 Mar. 2020, or the "active prechamber ignition insert", the French patent application of which has been filed on 13 May 2019 under no. 1904961, or the "inverted combustion directional valve ignition prechamber" which has formed the subject matter of French patent application no. 2001508 of 14 Feb. 2020, or also, the patent entitled "valve having a guide pin" published under no. WO2022079367 are noted.

All these patents and patent applications have in common, the fact of having, as most torch ignition devices do, according to the state of the art which are intended for alternative internal combustion engines, an ignition prechamber formed of a lamination cavity arranged in the cylinder head of an internal combustion engine.

The strategy that said patents, patent applications, and devices serve, is notably known as "Turbulent Jet Ignition".

According to said patents and patent applications, the lamination cavity is, on the one hand, connected to the combustion chamber of the internal combustion engine by a lamination duct, and on the other hand, receives a lamination injector which can inject in said cavity, a pilot load, pressurised beforehand by compression means, said load being constituted of an oxidiser/fuel mixture, readily inflammable by means of a spark.

It is noted that the combustion chamber itself receives a main load which can be either non-diluted, or, diluted with air or with recirculated exhaust gases, the dilution making it possible, notably, to maximise the energy efficiency of the internal combustion engine.

Said patents and patent applications belonging to the applicant are distinguished from the state of the art, in that the lamination duct describes a valve closing-off seat on which a lamination valve can rest, to close said duct. In doing so, said valve isolates the lamination cavity from the combustion chamber of the internal combustion engine.

However, when said valve is remote from said seat to rest on a chamber-side valve stop directly or by way of a damping chamber, as described in French patent application 3 085 718, said valve forms with the lamination duct, a torch ignition prechamber, which communicates simultaneously on the one hand, with the lamination cavity, and on the other hand, with the combustion chamber by way of gas ejection orifices.

This particular configuration makes it possible to introduce a pilot load into the lamination cavity, which remains fully inflammable, whatever the nature and the composition of the main load formed in the combustion chamber. Indeed, said main load and said pilot load can no longer be mixed, as the two said loads are sealingly separated by the lamination valve.

This advantage is decisive, as the composition, the pressure and the temperature of the pilot load can be radically different from those of the main load.

The lamination valve thus makes it possible to avoid one of the main shortcomings of torch ignition prechambers that can be qualified as "open"—i.e. without lamination valve—which, according to the state of the art, imply that if a gaseous mixture which is difficult to inflame, forms the main load, said mixture also forms—in part and by inappropriate mixture—the pilot load in the ignition prechamber.

Indeed, in the case of "open" prechambers, it results from the mixture between the main load and the pilot load that the latter is all the less capable of delivering a high ignition power than the ignition of the main load requires a high ignition power.

Conversely, and always in the case of "open" prechambers, when the main load is formed of a barely diluted and very active mixture which only requires a low ignition power in order to avoid the combustion of said load generating pressure gradients which are too high and noise in the main chamber, the pilot load is too energetic, as it is partially formed of the mixture constituting the main load, and that it inherits its pressure and temperature.

In other words, without lamination valve which, according to patent no. FR 3 061 743, makes it possible to close the lamination duct, the pilot load is necessarily partially formed from the mixture constituting the main load and therefore, said pilot load partially inherits the susceptibility for ignition and for the combustion of the main load, and its energy content is directly linked to the pressure that said main load imposes on it, which is contrary to the need.

Indeed, the less the main load is reactive, the more powerful the pilot load must be. Conversely, the more readily and rapidly the main load is burnable, the less energetic the pilot load must be to avoid a too rapid combustion of said main load.

That is why the valve-controlled ignition prechamber of patent FR 3 061 743 forms an autonomous torch ignition device, of which it is possible to freely adjust the power, this to find the best compromise between efficiency, polluting emissions and acoustic emissions of the internal combustion engine which receives it.

This being described, it is seen in the figures of patent WO2022079367 that, advantageously, an orientation pin emerges from the axial opening face which has the main valve body of the lamination valve, this to form a valve having a guide pin.

The orientation pin engages with an axial guide orifice in which it is housed with a small radial clearance, said orifice passing through a chamber-side valve stop. Thus, said pin can slide longitudinally in said orifice without ever fully exiting it. In doing so, said pin orients the valve having a guide pin in the lamination duct.

Upon reading patent WO2022079367, it is also noted that the valve having a guide pin comprises a peripheral centring surface arranged at the periphery of its main valve body, said surface being able to come into contact with the internal wall of the lamination duct to centre said body in said duct.

In patent WO2022079367, a valve damping chamber is formed by the lamination duct, by an axial opening face, and by a chamber-side valve stop, the volume of said chamber being maximum when an axial closing-off face that the valve having a guide pin has, rests on a duct closing-off seat that the lamination duct has, and minimum when the axial opening face rests on the chamber-side valve stop.

Patent WO2022079367 also describes that the valve having a guide pin can advantageously be, in full or in part, coated with a low-friction-coefficient material, resistant to abrasive wear, like a "Diamond Like Coating" or a physical vapour deposition, such as "Ionbond 90", however that the internal surfaces of the lamination duct which come into contact with said valve are, for example, coated with low-phosphorous-ratio chemical nickel.

As can be seen in the figures of patent WO2022079367, the lamination duct comprises a copper or stainless steel non-magnetic prechamber tip, coated or not with an anti-friction material, highly resistant to abrasion.

The non-magnetic character of the material constituting the prechamber tip is necessary for the magnetic valve return device, which is the subject matter of French patent application no. 3 085 718, without which the valve having a guide pin cannot close rapidly enough, particularly when said valve is applied to high revolution rotating engines, such as those which equip cars.

In the figures of patent WO2022079367, it is noted that the prechamber tip is mounted fretted either side between a gas ejection tube and a non-magnetic sleeve insert, said tip receiving the chamber-side valve stop and the axial guide orifice which accommodates the orientation pin with a small clearance.

It is noted that the non-magnetic prechamber tip discussed must be made of a material which is not only non-magnetic to be compatible with the magnetic valve return device which is the subject matter of French patent application no. 3 085 718, but which has a high thermal conductivity, like copper, so as to avoid the temperature of said tip becoming excessive, the latter being directly exposed to the hot gases present in the combustion chamber of the internal combustion engine.

Indeed, if the non-magnetic prechamber tip is too hot, it can cause the unintentional self-ignition of the main load contained in the combustion chamber, which could lead to the destruction of the internal combustion engine.

The problem is that copper, which the non-magnetic prechamber tip can advantageously be made of, is a ductile and malleable material that it is necessary to coat with a hard coating to make it resistant to abrasive wear induced by its friction with the peripheral centring surface of the valve having a guide pin, on the one hand, and to that induced by the friction of the orientation pin with the axial guide orifice, on the other hand.

Coating copper is however not adapted to the functional context of the valve having a guide pin, as soon as this relates to guaranteeing a long service life to the prechamber with a valve having a guide pin which results from the combination of patents no. FR 3 061 743 and no. WO2022079367.

Indeed, the torch ignition prechamber is subject to a high thermal load when ignition torches are ejected from said prechamber via gas ejection orifices, at temperatures greater than two thousand degrees Celsius.

For example, the chemical nickel coating is compatible with highly mechanical resistant copper alloys, like "C17500", but said coating is not resistant enough to temperature and abrasion to meet the operational specifications of the prechamber with a valve having a guide pin according to patent no. WO2022079367.

Indeed, in practice, the chemical nickel coating rapidly loses its mechanical properties with temperature, and it is repelled by the lamination valve, even, is deposited on said valve by succession of micro fusions.

The problem is that copper cannot receive coatings resistant to very high temperature, which are ordinarily applied to temperatures of between five hundred and eight hundred degrees Celsius.

A solution could consist of replacing copper with non-magnetic stainless steel, but said steel has an insufficient thermal conductivity.

SUMMARY OF THE INVENTION

It is therefore to resolve the different problems which have just been described and the dilemmas which result from these, that according to the friction insert for oriented valve according to the invention and according to a particular embodiment of said insert, the lamination valve and the orientation pin which form the valve having a guide pin are no longer guided directly by the material constituting the non-magnetic prechamber tip, but by way of guide means made of a hard material, resistant to abrasion, and compatible with the most effective antifriction coatings which are generally deposited at a high temperature.

In this regard, a valve-controlled ignition prechamber results from the friction insert to oriented valve according to the invention:

The non-magnetic prechamber tip of which can be made with a highly thermally conductive non-magnetic material, such as copper, without prejudice for the mechanical strength and the service life of said tip;

The service life of which is compatible with that of a car engine produced in large series, and the operation of which remains stable during said service life, guaranteeing to the internal combustion engine which receives it, an optimal efficiency and operation during its whole service life;

The large series manufacture of which does not reveal any particular difficulty;

The cost price of which is compatible with the economical constraints of the markets for cars produced in very large series.

It is understood that the friction insert for oriented valve according to the invention can not only be applied to the prechamber with a valve having a guide pin according to patent no. WO2022079367, but also to any other application close in its design and in its principle which could advantageously take advantage of the features and functionalities of said insert.

The friction insert for oriented valve for a valve-controlled ignition prechamber arranged in an internal combustion engine cylinder head which caps a combustion chamber, said prechamber comprising a lamination cavity in which ignition means and a lamination injector open, said cavity being connected to the combustion chamber by a lamination duct which opens in said chamber in the form of a non-magnetic prechamber tip, in which a lamination valve is accommodated which can close off said duct and which is oriented by an orientation pin which can slide in an axial guide orifice arranged in said tip, said valve and said pin together forming a valve having a guide pin, while the non-magnetic prechamber tip forms with said valve and when this does not close off the lamination duct, a torch ignition prechamber, which connects the lamination cavity to the combustion chamber by way of at least one gas ejection orifice, comprises:

At least one external valve body guide cylindrical bearing surface arranged at the periphery of the valve having a guide pin;

At least one first valve body guide means which is resistant to abrasive wear and which is fixedly mounted in the non-magnetic prechamber tip, said first means having, at least locally, an inner diameter which, on the one hand, is smaller than that of said tip, and which, on the other hand, is substantially larger than the outer diameter of the external valve body guide cylindrical bearing surface, the axial thickness of said first means and the axial position in the non-magnetic prechamber tip of said first means being intended such that the external valve body guide cylindrical bearing surface can slide with a small clearance into said first means, and this in order to guide radially the valve having a guide pin over all or part of its stroke in the non-magnetic prechamber tip;

At least one external tip guide cylindrical bearing surface arranged at the external periphery of the orientation pin;

At least one second orientation pin guide means which is resistant to abrasive wear and which is fixedly mounted in the axial guide orifice, said second means having, at least locally, an inner diameter which, on the one hand, is smaller than that of said orifice, and which, on the other hand, is substantially larger than the outer diameter of the external pin guide cylindrical bearing surface, the axial thickness and the axial position of said second means being intended such that the external pin guide cylindrical bearing surface can slide with a small clearance into said second means, and can maintain the longitudinal axis of the valve having a guide pin almost parallel to that of the non-magnetic prechamber tip over all or part of the stroke of said valve.

The friction insert for oriented valve comprises a first valve body guide means and a second orientation pin guide means, which are made of a highly thermally and mechanically resistant non-magnetic material.

The friction insert for oriented valve comprises a first valve body guide means and a second orientation pin guide means which form part of one same multifunctional insert, assembled or not, said insert being fixedly mounted in the non-magnetic prechamber tip, on the one hand, and accommodating all or part of the valve having a guide tip, on the other hand, said multifunctional insert being substituted for the non-magnetic prechamber tip to accommodate the axial guide orifice.

The friction insert for oriented valve comprises a multifunctional insert which forms, with an axial opening face oriented towards the combustion chamber that the valve having a guide pin has, on the one hand, and with the orientation pin, on the other hand, a valve damping chamber.

The friction insert for oriented valve comprises an axial guide orifice which has a damping counterbore at its end which opens into the valve damping chamber, said counterbore engaging with a damping shoulder that the orientation pin comprises.

The friction insert for oriented valve comprises a damping counterbore which is directly or indirectly connected to the combustion chamber by at least one depressurising duct.

The friction insert for oriented valve comprises a valve having a guide pin which comprises a secondary sealing collar which extends the external valve body guide cylindrical bearing surface in the direction of the lamination duct.

BRIEF DESCRIPTION OF THE DRAWINGS

The following description regarding the accompanying drawings and given as non-limiting examples will make it possible to best understand the invention, the features that it has, and the advantages that it can provide.

DESCRIPTION OF THE INVENTION

The friction insert for oriented valve 60 according to the invention has been shown in FIGS. 1 to 7, with various details of its components, its variants, and its accessories.

As FIGS. 1 to 7 show, the friction insert for oriented valve 60 is mainly intended for a valve-controlled ignition prechamber 1 arranged in an internal combustion engine cylinder head 2, the latter 2 capping a combustion chamber 3, said prechamber 1 comprising a lamination cavity 4, wherein ignition means 5 and a lamination injector 6.

As can be seen clearly in FIGS. 1 to 6, the lamination cavity 4 is connected to the combustion chamber 3 by a lamination duct 7 which opens into said chamber 3 in the form of a non-magnetic prechamber tip 62.

It is noted in FIGS. 1 to 7, that the non-magnetic prechamber tip 62 accommodates a lamination valve 61 which can close off the lamination duct 7 and which is oriented by an orientation pin 15.

Figure 1:
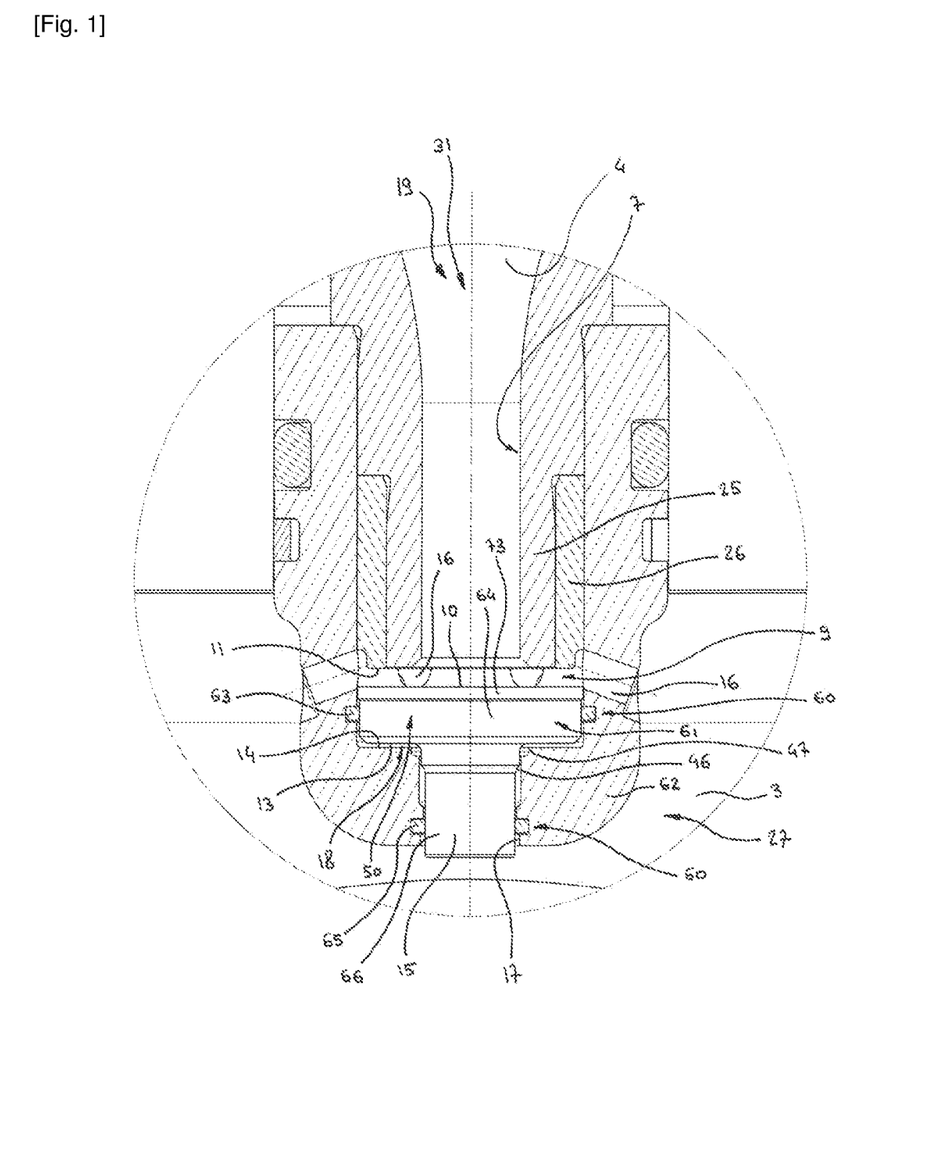
FIG. 1 is a schematic, cross-sectional view of the friction insert for oriented valve according to the invention, the first valve body guide means and the second orientation pin guide means of which are fixedly mounted in the non-magnetic prechamber tip, independently from one another.
Figure 3:
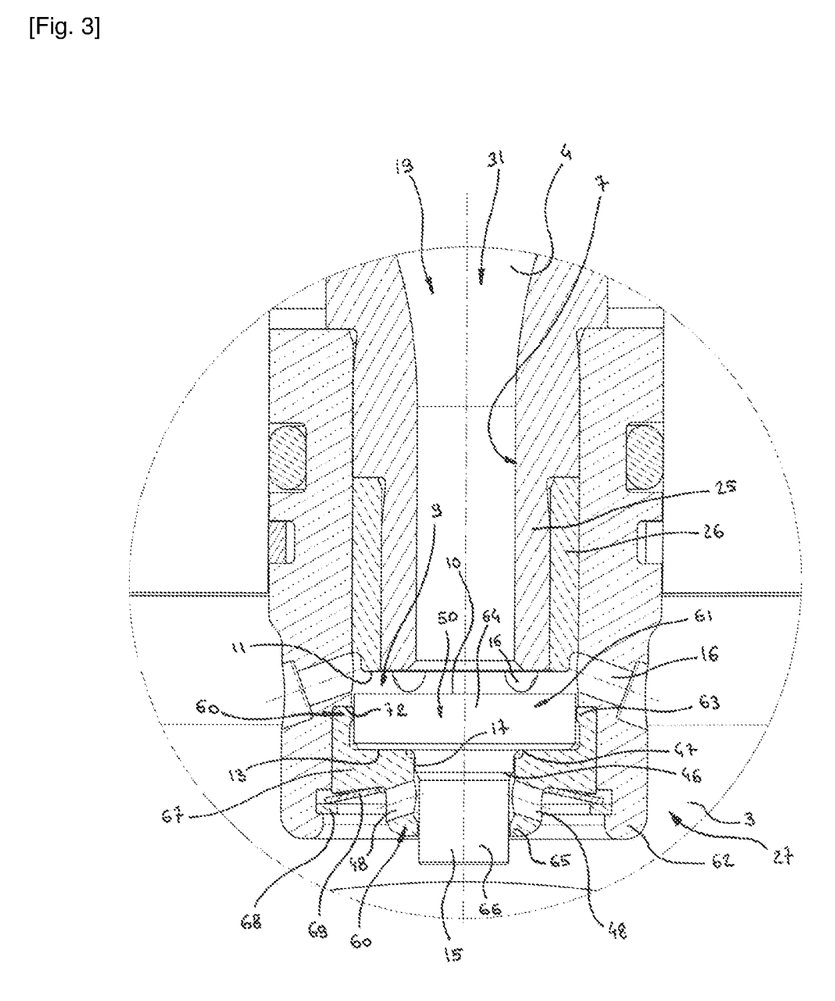
FIG. 3 is a schematic, cross-sectional view of the friction insert for oriented valve according to the invention and according to the variant shown in FIG. 2, the valve having a guide pin being open, its axial opening face of the valve having a guide pin resting on the chamber-side valve stop, said valve forming, with the non-magnetic prechamber tip, a torch ignition prechamber, while the lamination duct is connected to the combustion chamber, and that the volume of the valve damping chamber is minimum.

As FIGS. 1 and 3 successively show, the orientation pin 15 can slide in an axial guide orifice 17 arranged in the non-magnetic prechamber tip 62, the lamination valve 61 and said pin 15 together forming a valve 50 having a guide pin while the non-magnetic prechamber tip 62 forms with said valve 50 and when this does not close off the lamination duct 7, a torch ignition prechamber 9.

Figure 4:
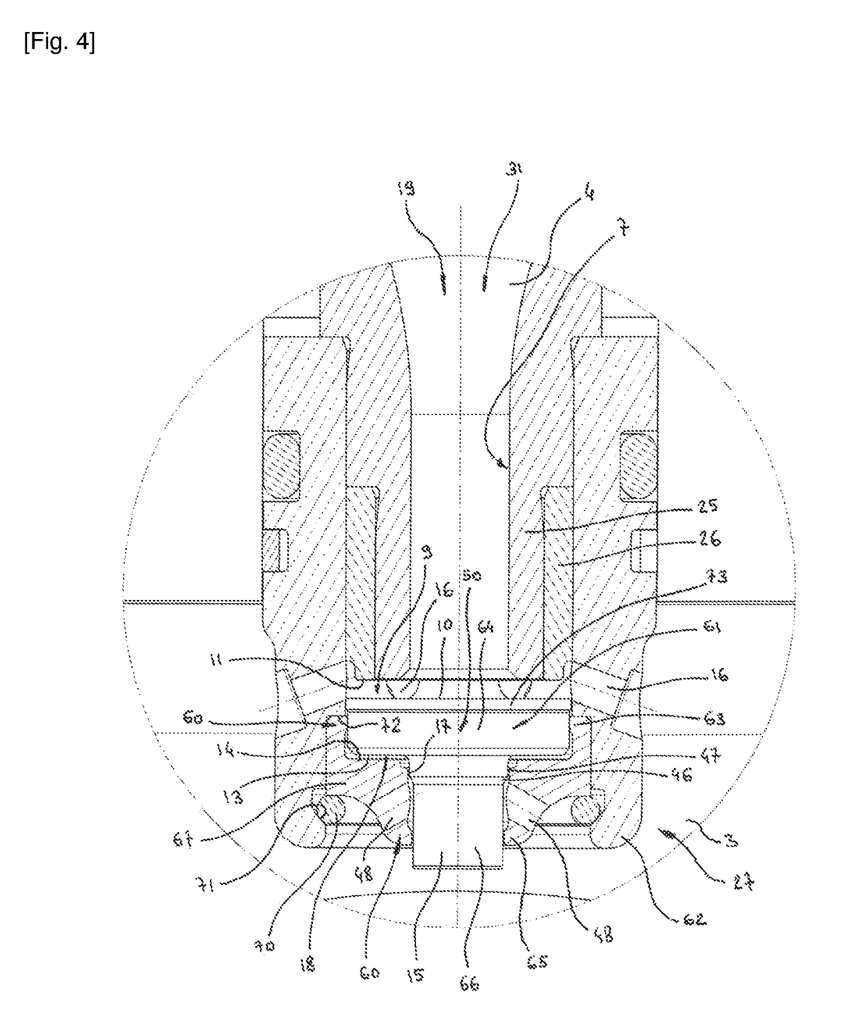
FIG. 4 is a schematic, cross-sectional view of the friction insert for oriented valve according to the invention and according to the variant shown in FIG. 2, to this close difference that the multifunctional insert is maintained flattened against the axial insert bearing shoulder by an axial stop extendible ring which engages with a flattening cone arranged at the end of the non-magnetic prechamber tip.

It is noted in FIGS. 1, 3 and 4 that the torch ignition prechamber 9 connects the lamination cavity 6 to the combustion chamber 3 by way of at least one gas ejection orifice 16.

Figure 2:
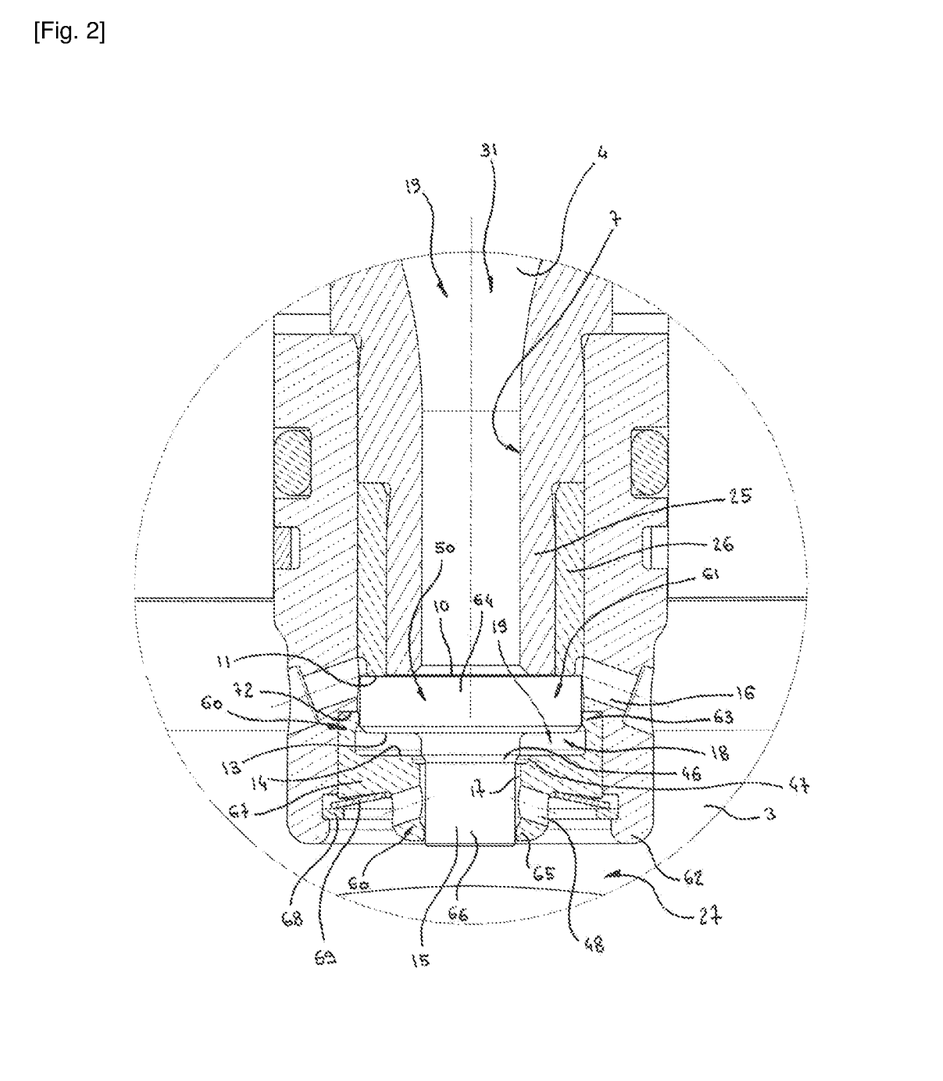
FIG. 2 is a schematic, cross-sectional view of the friction insert for oriented valve according to the invention, the first valve body guide means and the second orientation pin guide means forming part of one same multifunctional insert which is fixedly mounted in the non-magnetic prechamber tip, against which it is maintained flattened by a snap ring, a "Belleville"-type disc spring, and by way of an axial insert bearing shoulder that said tip has, the valve having a guide tip being closed, i.e. closing off the lamination duct, however the volume of the valve damping chamber is maximum.

In FIG. 2, it has been shown that the valve 50 having a guide pin has an axial closing-off face 10 which can rest on a duct closing-off seat 11 that the lamination duct 7 has, to close off the latter.

In FIG. 3, it has been shown that the valve 50 having a guide pin also has an axial opening face 13 which, when it is in contact with a chamber-side valve stop 14, determines the position of the valve 50 having a guide pin the most remote from the lamination cavity 4, said valve 50 letting, when it is in said position, gases 19 freely circulate between the lamination cavity 4 and the combustion chamber 3.

Figure 7:
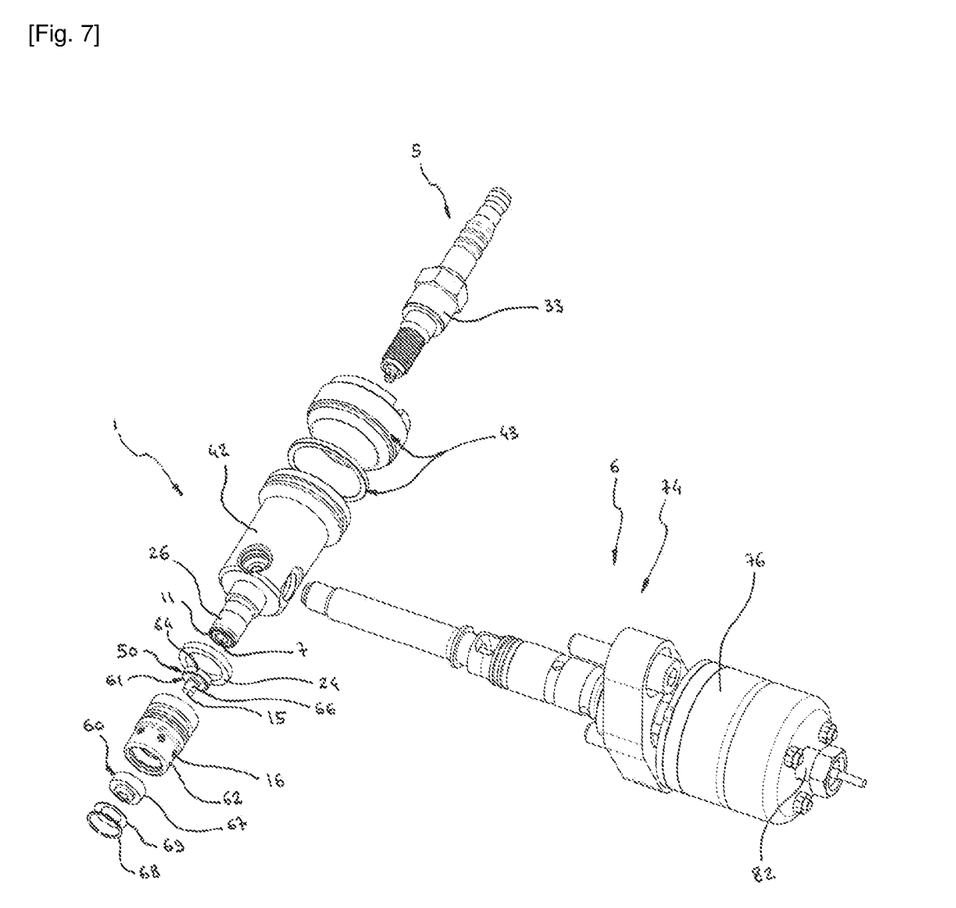
FIG. 7 is an exploded, three-dimensional view of the friction insert for oriented valve according to the invention and according to the variant shown in FIG. 2, but without the internal combustion engine.

It has been particularly illustrated in FIGS. 1 to 4 and in FIG. 7, that the friction insert for oriented valve 60 according to the invention comprises at least one external valve body guide cylindrical bearing surface 64 arranged at the periphery of the valve 50 having a guide pin.

In a manner which can be seen particularly in FIG. 1, it has been shown that the friction insert for oriented valve 60 according to the invention also comprises at least one first valve body guide means 63 which can be, for example and as shown in FIG. 1, a continuous or cutting ring, said first means 63 being resistant to abrasive wear and being fixedly mounted in the non-magnetic prechamber tip 62.

The first valve body guide means 63 has, at least locally, an inner diameter which is smaller than that of the non-magnetic prechamber tip 62, said diameter being substantially larger than the outer diameter of the external valve body guide cylindrical bearing surface 64.

As FIGS. 2 and 3 show, the axial thickness of the first valve body guide means 63 and the axial position in the non-magnetic prechamber tip 62 of said first means 63 are intended such that the external valve body guide cylindrical bearing surface 64 can slide with a small clearance into said first means 63, and this in order to guide radially the valve having a guide pin 50 over all or part of its stroke in the non-magnetic prechamber tip 62.

As can be noted in FIGS. 1 to 4, the internal surface of the first valve body guide means 63 can have a curved axial profile which avoids said means 63 exposing a sharp edge to the external valve body guide cylindrical bearing surface 64 when it comes into contact with the latter.

In FIGS. 1 to 7, it has also been shown that the friction insert for oriented valve 60 according to the invention further comprises at least one external guide pin cylindrical bearing surface 66 arranged at the external periphery of the orientation pin 15.

In a manner which can be seen particularly in FIG. 1, it has also been shown that the friction insert for oriented valve 60 according to the invention comprises at least one second orientation pin guide means 65 which can be, for example and as shown in FIG. 1, a continuous or cutting ring, said second means 65 being resistant to abrasive wear and being fixedly mounted in the axial guide orifice 17.

The second orientation pin guide means 65 has, at least locally, an inner diameter which is smaller than that of the axial guide orifice 17, said diameter being substantially larger than the outer diameter of the external pin guide cylindrical bearing surface 66.

As FIGS. 2 and 3 show, the axial thickness and the axial position of the second orientation pin guide means 65 are intended such that the external pin guide cylindrical bearing surface 66 can slide with a small clearance into said second means 65, and can maintain the longitudinal axis of the valve 50 having a guide pin almost parallel to that of the non-magnetic prechamber tip 62 over all or part of the stroke of said valve 50.

As can be noted in FIGS. 1 to 4, the internal surface of the second orientation pin guide means 65 can have a curved axial profile which avoids said second means 65 exposing a sharp edge to the external pin guide cylindrical bearing surface 66 when it comes into contact with the latter.

It will be noted that according to a variant of an embodiment of the friction insert for oriented valve 60 according to the invention, the first valve body guide means 63 and/or the second orientation pin guide means 65 can be made of a highly thermally and mechanically resistant non-magnetic material such as "Inconel 718".

As a variant, advantageously and as FIGS. 2 to 7 illustrate, the first valve body guide means 63 and the second orientation pin guide means 65 can form part of one same multifunctional insert 67, assembled or not, said insert 67 being fixedly mounted in the non-magnetic prechamber tip 62.

In this case, the multifunctional insert 67 can accommodate all or part of the valve 50 having a guide pin, said insert 67 being substituted for the non-magnetic prechamber tip 62 to accommodate the axial guide orifice 17.

As has been shown in FIGS. 2 and 3, the axial position of the multifunctional insert 67 in the non-magnetic prechamber tip 62 can be fixed by an axial insert bearing shoulder 72 that said tip 62 has, a snap ring 68 and a disc spring 69, for example of the "Belleville" type, known per se maintaining said insert 67 flattened against said shoulder 72.

It is noted that the multifunctional insert 67, the snap ring 68, and the disc spring 69, can advantageously be made of a non-magnetic, stainless metal, and preserving a high mechanical resistance to high temperatures, such as "Inconel".

It is noted in FIG. 4 that as an alternative, the multifunctional insert 67 can be maintained flattened against the axial insert bearing shoulder 72 by an axial stop extendible ring 70 which engages with a flattening cone 71 arranged at the end of the non-magnetic prechamber tip 62.

In addition to or as an alternative to what has just been described, the multifunctional insert 67 can be mounted clamped in the non-magnetic prechamber tip 62 to ensure a maximum thermal cohesion between said insert 67 and said tip 62, this such that the heat that said insert 67 receives during the combustion of a main load 27 in the combustion chamber 3 can be discharged by conduction via the non-magnetic prechamber tip 62.

As has been clearly shown in FIGS. 2 to 4, the multifunctional insert 67 can form, with an axial opening face 13 oriented towards the combustion chamber 3 that the valve having a guide pin 50 has, on the one hand, and with the orientation pin 15 on the other hand, a valve damping chamber 18.

In this case, when the valve having a guide pin 50 is opened to form a torch ignition prechamber 9 with the non-magnetic prechamber tip 62, the valve damping chamber 18 dampens the possible impact which could occur between the axial opening face 13 and a chamber-side valve stop 14 which stops said valve 50 in its stroke in the direction of the combustion chamber 3, said stop 14 only being other than the bottom of the valve damping chamber 18.

As FIGS. 1 to 4 show, the axial guide orifice 17 of the friction insert for oriented valve 60 according to the invention can have a damping counterbore 47 at its end which opens into the valve damping chamber 18, said counterbore 47 engaging with a damping shoulder 47 that the orientation pin 15 comprises.

It is noted that the damping counterbore 47 and the damping shoulder 46 are positioned such that the valve having a guide pin 50 can cover the first part of its stroke towards the chamber-side valve stop 14 by being slowed down as little as possible by the valve damping chamber 18.

Indeed, as the damping shoulder 46 has not arrived at the damping counterbore 47, the gases 19 contained in the valve damping chamber 18 can freely exit from the latter in the direction of the combustion chamber 3, via the clearance left between said shoulder 46 and said counterbore 47, then via depressurising ducts 48 shown in FIGS. 2 to 4.

When the damping shoulder 46 arrives at the damping counterbore 47, the gases 19 are found highly laminated by the passage restriction thus formed, such that during the second part of its stroke towards the chamber-side valve stop 14, the valve 50 having a guide pin is slowed down, which accordingly reduces the power of any impact which could occur between the axial opening face 13 and the chamber-side valve stop 14.

This particular configuration of the multifunctional insert 67 and of the valve 50 having a guide pin gives the latter a long service life.

In FIGS. 2 to 4, it has therefore actually been shown that the damping counterbore 47 can be directly or indirectly connected to the combustion chamber 3 by at least one depressurising conduit 48.

As a variant of an embodiment of the friction insert for oriented valve 60 according to the invention, it has been shown in FIGS. 1 and 4, that the valve 50 having a guide pin can comprise a secondary sealing collar 73 which extends the external valve body guide cylindrical bearing surface 64 in the direction of the lamination duct 7, said collar 73 forming a labyrinth seal or at least one baffle which opposes a resistance to the gas passage 19 which penetrate or which exit from the valve damping chamber 18.

Operation of the Invention

The operation of the friction insert for oriented valve 60 according to the invention is easily understood in view of FIGS. 1 to 7.

Figure 5:
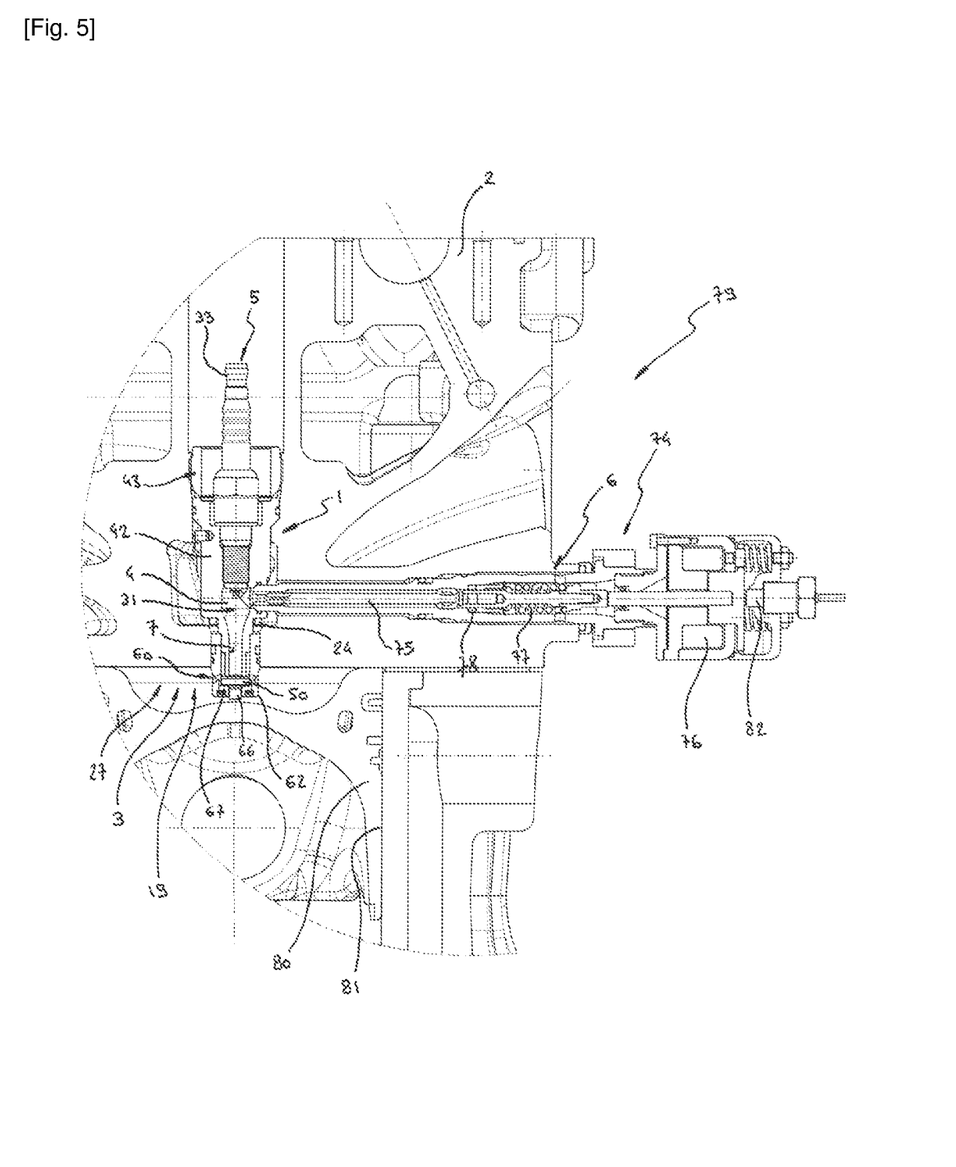
FIG. 5 is a schematic, cross-sectional view of the friction insert for oriented valve according to the invention and according to the variant shown in FIG. 2, in the environment of an internal combustion engine which receives said insert, the latter taking place at the end of an active prechamber ignition insert such as described in French patent application no. 1904961 belonging to the applicant, and engaging with a spark plug and an electromechanically controlled lamination injector.
Figure 6:
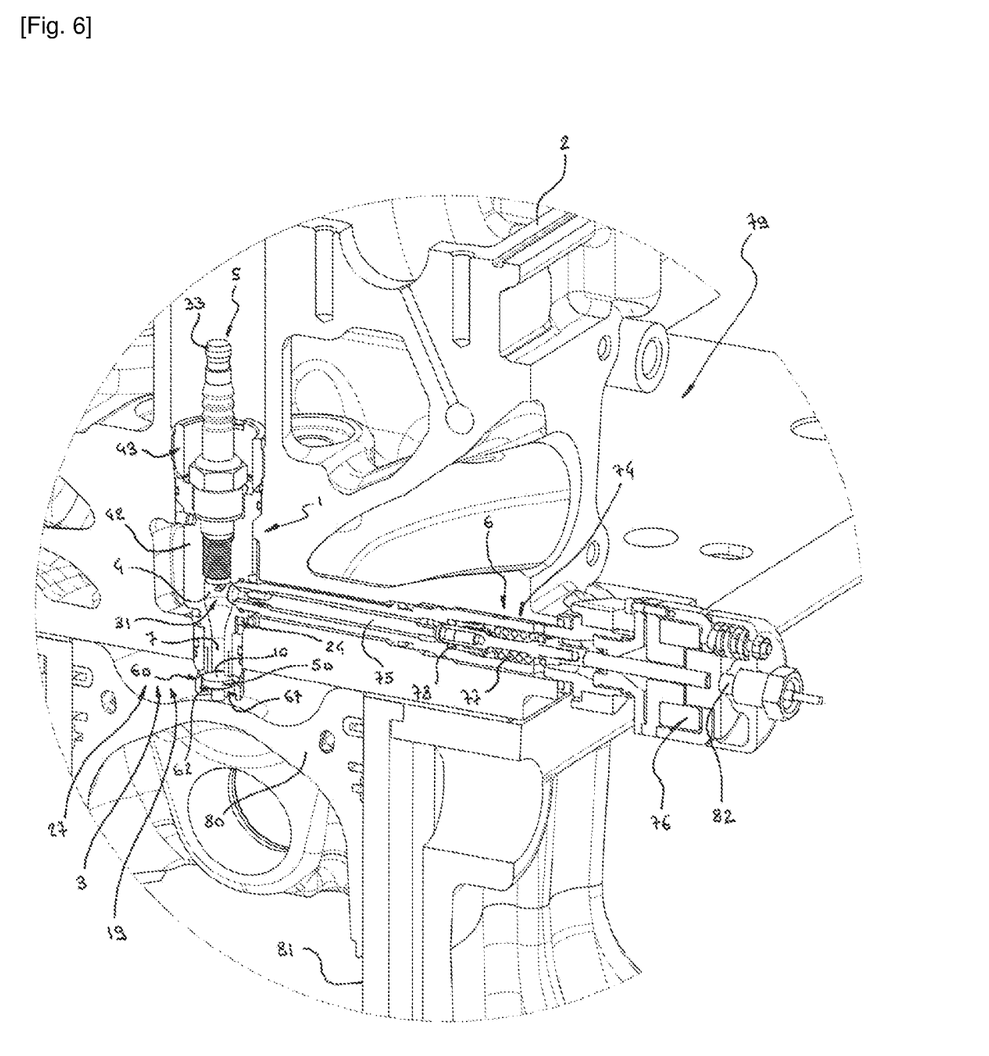
FIG. 6 is a three-dimensional view of the friction insert for oriented valve according to the invention and according to the variant shown in FIG. 2.

FIGS. 5 to 7 show the environment of the invention which is mainly constituted of the internal combustion engine cylinder head 2 of an internal combustion engine 79, the latter comprising a piston 80 and a cylinder 81 which form, with said cylinder head 2, a combustion chamber 3.

It has been clearly shown in FIGS. 1 to 4, that the lamination duct 7 has a gas ejection tube 25 made, according to this example, of stainless steel with high magnetic permeability and low magnetic remanence, said duct 7 also comprising a non-magnetic sleeve insert 26 which is made, for example, of "Inconel 718", which is mounted fretted on the gas ejection tube 25, and which receives the conduit closing-off seat 11.

In FIGS. 1 to 7, it is noted that the lamination duct 7 opens into the combustion chamber 3 in the form of a copper alloy non-magnetic prechamber tip 62, for example a "C17500"-type Copper-Beryllium-Cobalt, said tip 62 being mounted fretted either side between the gas ejection tube 25 and the non-magnetic sleeve insert 26.

It is noted in FIGS. 1 to 7, that it is the non-magnetic prechamber tip 62 which receives the friction insert for oriented valve 60 according to the invention, and this, in two main forms.

The first form, shown in FIG. 1, consists of a first valve body guide means 63 and a second orientation tip guide means 65 which take the form of rings mounted independently from one another in the non-magnetic prechamber tip 62.

The second form, shown in FIGS. 2 to 7, intends that the first valve body guide means 63 and the second orientation tip guide means 65 form part of one single and same multifunctional insert 67 fixedly mounted in the non-magnetic prechamber tip 62.

It is in this second form and particularly of its variant of an embodiment shown in FIGS. 2, 3 and 5 to 7, that the specific operation of the friction insert for oriented valve 60 according to the invention will be detailed in this case, bearing in mind that in the context of said insert 60, the operation of the valve 50 having a guide pin is identical to that described in patent no. WO2022079367, the aim of the friction insert for oriented valve 60 according to the invention not being to modify said operation, but to ensure a great stability over time to the latter, and a great durability to the valve-controlled ignition prechamber 1.

According to the variant of the friction insert for oriented valve 60 according to the invention shown in FIGS. 2, 3, 5, 6 and 7, the multifunctional insert 67 is maintained axially flattened by a snap ring 68 and by a "Belleville"-type disc spring 69 on an axial insert bearing shoulder 72 arranged in the non-magnetic prechamber tip 62, said insert 67, said snap ring 68 and said disc spring 69 being made of "Inconel", a stainless and non-magnetic metal which preserves a great mechanical resistance to high temperatures.

Advantageously, the multifunctional insert 67 is, in this case, mounted clamped in the non-magnetic prechamber tip 62 which ensures a maximum thermal cohesion between said insert 67 and said tip 62.

Thus, during the combustion of the main load 27 in the combustion chamber 3, the heat that the multifunctional insert receives 67 from the hot gases 19 with which it is in contact can effectively be discharged by conduction via the non-magnetic prechamber tip 62.

In FIG. 2, the valve 50 having a guide pin has been shown in the "fully closed" position, i.e. with its axial closing-off face 10 which is in contact with the conduit closing-off seat 11, such that the lamination duct 7 is closed off and that no gas 19 can circulate from the lamination cavity 4 to the combustion chamber 3 or conversely, the volume of the valve damping chamber 18 being maximum.

FIG. 3 itself shows the valve 50 having a guide pin in the "fully open" position, i.e. with its axial opening face 13 which is in contact with the chamber-side valve stop 14, such that the lamination duct 7 is also fully open, said valve 50 forming with the non-magnetic prechamber tip 62, a torch ignition prechamber 9, while the gases 19 can circulate from the lamination cavity 4 to the combustion chamber 3, the volume of the valve damping chamber 18 being minimum.

It is noted, particularly in FIGS. 2 and 3, that the orientation pin 15 comprises a damping shoulder 46 which engages with a damping counterbore 47 arranged at the inlet of the axial guide orifice 17, said counterbore 47 opening into the valve damping chamber 18.

This particular configuration of the multifunctional insert 67 and of the valve 50 having a guide pin makes it possible for the latter to cover the first part of its stroke to the chamber-side valve stop 14 by being slowed down as little as possible by the valve damping chamber 18.

Indeed, while the damping shoulder 46 has not arrived at the damping counterbore 47, the gases 19 contained in the valve damping chamber 18 can freely exit from the latter in the direction of the combustion chamber 3, via the clearance left between said shoulder 46 and said counterbore 47, then via the depressurising ducts 48.

When the damping shoulder 46 reaches the damping counterbore 47, the gases 19 are highly laminated by the passage restriction thus formed, such that during the second part of its stroke to the chamber-side valve stop 14, the valve having a guide pin 50 is slowed down, which reduces the power of any impact which could occur between the axial opening face 13 and the chamber-side valve stop 14.

This particular configuration of the valve 50 having a guide pin gives the latter a long service life.

The presence of a permanent return magnet 24 is noted in FIGS. 5 to 7, which forms a "magnetic valve return device", such as described in French patent application no. 3 085 718.

The permanent return magnet 24 ensures the reclosing of the valve 50 having a guide pin after the latter has been opened by the increase in pressure of the gases 19 occurring in the lamination cavity 4, this after a pilot load 31 has been introduced in said cavity 4 by an electromechanically controlled lamination injector 74, then ignited by a spark plug 33.

In FIGS. 5 to 7, the electromechanically controlled lamination injector 74 has been shown which comprises an injector needle 75 which, when it lifts from its seat under the action of an electromagnetic injector actuator 76, introduces a pilot load 31 in the lamination cavity 4.

When the electromagnetic injector actuator 76 stops being powered, the injector needle 75 is returned on its seat by a return needle spring 77, the latter being isolated from the gases 19 constituting the pilot load 31 by a spring isolation seal 78.

As FIGS. 5 to 7 show, the position of the injector needle 75 is permanently returned to a computer not represented by an injector needle position sensor 82, the latter making it possible for said computer to specifically adjust the mass of the pilot load 31 which is introduced into the lamination cavity 4 by the electromechanically controlled lamination injector 74.

For that, said computer executes software which determines, permanently and from the lifting of the injector needle 75 read by the injector needle position sensor 82, the mass of the pilot load 31 which is introduced into the lamination cavity 4, said software correcting, if necessary, said lifting, such that the pilot load 31 mass actually introduced into the lamination cavity 4 corresponds to that necessary for the optimal operation of the internal combustion engine 79.

It is noted in FIGS. 5 to 7, that the lamination cavity 4 is arranged in an active prechamber ignition insert 42 similar to that described in French patent application no. 1904961 of 13 May 2019 belonging to the applicant, said insert 42 being fixedly maintained in the internal combustion engine cylinder head 2 by insert clamping means 43.

As has been seen, the operation of the valve 50 having a guide pin in the context of the friction insert for oriented valve 60 according to the invention is comparable to that described in patent no. WO2022079367.

However, contrary to said patent no. WO2022079367 and to what the initial patent FR 3 061 743 shows relating to a valve ignition prechamber, and contrary to what the patents for improvement arising from said initial patent show, the contact lines which, previously, were always located in the same place on the lamination valve 61 and which were variable in altitude inside the lamination duct 7 become fixed in said duct 7, i.e. fixed in the non-magnetic prechamber tip 62 in the form of which said duct 7 ends, and variable in altitude on the valve 50 having a guide pin and relative to the latter.

This novel configuration avoids having to coat the inside of the non-magnetic prechamber tip 62 with any coating at all, as indeed, the coatings which remain hard and resistant to abrasion at high temperatures are notoriously incompatible with copper alloy, of which the non-magnetic prechamber tip 62 is constituted, due to the high temperature at which said coatings are applied.

Yet, advantageously, the friction insert for oriented valve 60 according to the invention makes it possible for the first valve body guide means 63 and the second orientation pin guide means 65 to be made of a material such as "Inconel" which is both core-hard, such that it forms a substrate which is more favourable to hard coatings, and which is resistant to high temperatures, such that it can receive a wide range of "DLC"-, "PVD"-type hard coatings, or any type known to a person skilled in the art.

Advantageously, the valve 50 having a guide pin itself being made of a material preserving a high mechanical resistance at high temperature, said valve 50 can also be covered with any type of anti-abrasion coating.

It results from that above, that the friction insert for oriented valve 60 according to the invention makes it possible to choose coatings which are compatible with one another, said coatings giving a long service life, both to the first valve body guide means 63 and to the second orientation pin guide means 65, and to the valve 50 having a guide pin.

To give a great hammering resistance to the chamber-side valve stop 14 that forms the bottom of the valve damping chamber 18, said stop 14 advantageously forms part of the multifunctional insert 67 as has been shown in FIGS. 2 to 7 and benefits from the same mechanical resistance and from the same resistance to abrasion as any other part of said insert 67.

Thus, the first valve body guide means 63, the second orientation pin guide means 65 and the chamber-side valve stop 14 not constituting more than one single and same part which takes the form of the multifunctional insert 67, the core and surface mechanical features at high temperature of the material constituting said insert 67 benefit all the operational surfaces which engage with the valve 50 having a guide pin.

Knowing that the valve 50 having a guide pin develops in the multifunctional insert 67 almost permanently in contact with the first valve body guide means 63 and the second orientation pin guide means 65, and in periodic contact with the chamber-side valve stop 14, without benefiting from any lubrication, a person skilled in the art can only understand the fundamental advantage that the friction insert for oriented valve 60 according to the invention represents in the implementation and the durable operation of the valve 50 having a guide pin.

Indeed, the valve having a guide pin 50 develops "dry" in the multifunctional insert 67, and undergoes an abrasive aggression all the more greater than foreign bodies, such as mineral or carbon particles, can be inserted at high temperature between said valve 50 and the first valve body guide means 63, the second orientation pin guide means 65, and the chamber-side valve stop 14 with which is engages.

It will be noted that the example of an embodiment of the friction insert for oriented valve 60 according to the invention which has just been described is non-limiting.

Indeed, the friction insert for oriented valve 60 according to the invention can be applied to other fields such as single internal combustion engines.

Said insert 60 can, for example, be applied to gas nailers, to firearms, or to any apparatus requiring the ignition of a main load by means of a pilot load with the best effectiveness as possible.

The options for the friction insert for oriented valve 60 according to the invention are not limited to the applications which have just been described, and it must moreover be understood that the description above has only been given as an example and that it does not at all limit the field of said invention which cannot be moved away from, by replacing the execution details described by any other equivalent.

The invention claimed is:

1. Friction insert for oriented valve for a valve-controlled ignition prechamber arranged in an internal combustion engine cylinder head which caps a combustion chamber, the prechamber comprising a lamination cavity, in which ignition means and a lamination injector open, the cavity being connected to the combustion duct by a lamination duct which opens into the chamber in the form of a non-magnetic prechamber tip, in which a lamination valve is accommodated, which can close off the conduit and which is oriented by an orientation pin which can slide into an axial guide orifice arranged in the tip, the valve and the pin, together forming a valve having a guide pin, while the non-magnetic prechamber tip forms with the valve and when this does not close off the lamination duct, a torch ignition prechamber which connects the lamination cavity to the combustion chamber by way of at least one gas ejection orifice comprising:

at least one external valve body guide cylindrical bearing surface arranged at the periphery of the valve having a guide pin;

at least one first valve body guide means which is resistant to abrasive wear and which is fixedly mounted in the non-magnetic prechamber tip, the first means having, at least locally, an inner diameter that is both smaller than that of the tip, and that is also substantially larger than the outer diameter of the external valve body guide cylindrical bearing surface, the axial thickness of the first means and the axial position in the non-magnetic prechamber tip of the first means being formed such that the external valve body guide cylindrical bearing surface can slide with a small clearance into the first means, and this in order to guide radially the valve having a guide pin over all or part of its stroke in the non-magnetic prechamber tip;

at least one external pin guide cylindrical bearing surface arranged at the periphery of the orientation pin;

at least one second orientation pin guide means which is resistant to abrasive wear and which is fixedly mounted in the axial guide orifice, the second means having, at least locally, an inner diameter that is both smaller than that of the orifice, and that is also substantially larger than the outer diameter of the external pin guide cylindrical bearing surface, the axial thickness and the axial position of the means being formed such that the external pin guide cylindrical bearing surface can slide with a small clearance into the second means, and can maintain the longitudinal axis of the valve having a guide pin almost parallel to that of the non-magnetic prechamber tip over all or part of the stroke of the valve.

2. The friction insert according to claim 1, wherein the first valve body guide means and the second orientation pin guide means are made of a highly thermally and mechanically resistant non-magnetic material.

3. The friction insert according to claim 1, wherein the first valve body guide means and the second orientation pin guide means form part of one same multifunctional insert, assembled or not, the insert being both fixedly mounted in the non-magnetic prechamber tip, and also accommodating all or part of the valve having a guide pin, the multifunctional insert being substituted for the non-magnetic prechamber tip to accommodate the axial guide orifice.

4. The friction insert according to claim 3, wherein the multifunctional insert forms, with both an axial opening face oriented towards the combustion chamber that the valve having a guide pin has, and also with the orientation pin, a valve damping chamber.

5. The friction insert according to claim 3, wherein the axial guide orifice has a damping counterbore at the end which opens into the valve damping chamber, the counterbore engaging with a damping shoulder that the orientation pin comprises.

6. The friction insert according to claim 5, wherein the damping counterbore is directly or indirectly connected to the combustion chamber by at least one depressurising duct.

7. The friction insert according to claim 1, wherein the valve having a guide pin comprises a secondary sealing collar which extends the external valve body guide cylindrical bearing surface in the direction of the lamination duct.

* * * * *